(12) United States Patent
Chen

(10) Patent No.: US 8,002,354 B2
(45) Date of Patent: Aug. 23, 2011

(54) CHAIR DEVICE FOR PERSON CARRIER

(75) Inventor: Shih-Wen Chen, Ciaotou Township, Kaohsiung County (TW)

(73) Assignee: Freerider Corp., Kaohsiung County (TW)

( * ) Notice: Subject to any disclaimer, the term of this patent is extended or adjusted under 35 U.S.C. 154(b) by 192 days.

(21) Appl. No.: 12/453,705

(22) Filed: May 20, 2009

(65) Prior Publication Data

US 2010/0295356 A1    Nov. 25, 2010

(51) Int. Cl.
*A47C 7/00* (2006.01)
*A47C 7/02* (2006.01)

(52) U.S. Cl. ............ 297/378.1; 297/440.15; 297/440.2

(58) Field of Classification Search ............. 297/378.1, 297/440.15, 440.2
See application file for complete search history.

(56) References Cited

U.S. PATENT DOCUMENTS

| | | | | |
|---|---|---|---|---|
| 1,793,045 A * | 2/1931 | Bitzenburger | ......... | 297/301.5 X |
| 3,245,717 A * | 4/1966 | Levy | ............. | 297/254 |
| 3,982,785 A * | 9/1976 | Ambasz | ............. | 297/440.15 X |
| 4,123,105 A * | 10/1978 | Frey et al. | ................... | 297/451.1 |
| 4,529,247 A * | 7/1985 | Stumpf et al. | ............. | 297/300.4 |
| 4,746,166 A * | 5/1988 | Sadan | ............... | 297/17 |
| 5,018,788 A * | 5/1991 | Cedergreen | ................ | 297/378.1 |
| 5,052,076 A * | 10/1991 | Spaeth | ............. | 16/266 |
| 5,064,247 A * | 11/1991 | Clark et al. | ............. | 297/440.2 X |
| 5,102,196 A * | 4/1992 | Kaneda et al. | ............. | 297/452.15 |
| 5,110,186 A * | 5/1992 | Clark et al. | ................ | 297/440.2 |
| 5,190,344 A * | 3/1993 | Anderson et al. | ...... | 297/378.1 X |
| 5,201,108 A * | 4/1993 | Clark et al. | ..................... | 29/434 |
| 5,297,851 A * | 3/1994 | Van Hekken | ............ | 297/452.14 |
| 5,318,346 A * | 6/1994 | Roossien et al. | ............ | 297/300.1 |
| 5,460,426 A * | 10/1995 | Tribelsky et al. | ........ | 297/378.1 X |
| 5,487,591 A * | 1/1996 | Knoblock | ................ | 297/452.14 |
| 5,540,481 A * | 7/1996 | Roossien et al. | ............ | 297/300.4 |
| 5,611,598 A * | 3/1997 | Knoblock | ................ | 297/452.14 |
| 5,662,381 A * | 9/1997 | Roossien et al. | ....... | 297/440.2 X |
| 5,725,279 A * | 3/1998 | Ward et al. | .................. | 297/378.1 |
| 5,820,221 A * | 10/1998 | Greaves et al. | ...... | 297/378.14 X |
| 5,842,264 A * | 12/1998 | Roossien et al. | ....... | 297/440.2 X |
| 5,951,110 A * | 9/1999 | Conner et al. | ............ | 297/452.31 |
| 5,956,810 A * | 9/1999 | Spaeth | ............. | 16/358 |
| 5,992,936 A * | 11/1999 | Greaves | ................ | 297/440.2 X |
| 6,033,027 A * | 3/2000 | Conner et al. | ............. | 297/452.59 |
| 6,042,187 A * | 3/2000 | Conner et al. | ............. | 297/452.6 |
| 6,045,190 A * | 4/2000 | Ward et al. | ................ | 297/378.1 |
| 6,062,649 A * | 5/2000 | Nagel et al. | ............. | 297/440.2 X |
| 6,135,562 A * | 10/2000 | Infanti | ........ | 297/440.2 |
| 6,164,724 A * | 12/2000 | Greaves | ................ | 297/440.2 X |
| 6,168,239 B1 * | 1/2001 | Conner et al. | ........... | 297/452.31 |
| 6,186,595 B1 * | 2/2001 | Ward et al. | ................ | 297/378.1 |
| 6,220,661 B1 * | 4/2001 | Peterson | ............... | 297/440.11 X |
| 6,305,750 B1 * | 10/2001 | Buono et al. | ............... | 297/440.2 |

(Continued)

*Primary Examiner* — Rodney B White
(74) *Attorney, Agent, or Firm* — Rosenberg, Klein & Lee

(57) ABSTRACT

A chair device for a person carrier includes a backrest unit formed by a front backrest and a rear backrest. The backrest unit is pivotally joined to a seat unit in which two opposite fan-shaped limit projecting members are provided at each pivot-joint end of the seat unit. The fan-shaped limit projecting members can be angularly displaced to a position to be engaged with fan-shaped recesses in the pivot-joint ends of the rear backrest. The fan-shaped limit projecting members have a position limited space for angular displacement within the fan-shaped recesses so that the backrest unit of the chair can move in the range between a collapsing state and an unfolding state. Furthermore, strength reinforcing edge ribs are provided at both sides where the front backrest is assembled to the rear backrest.

3 Claims, 7 Drawing Sheets

U.S. PATENT DOCUMENTS

| | | | |
|---|---|---|---|
| 6,353,970 B1 * | 3/2002 | Spaeth | 297/378.1 X |
| 6,508,509 B2 * | 1/2003 | Peterson | 297/440.2 X |
| 6,749,262 B2 * | 6/2004 | Schaffner et al. | 297/378.1 X |
| 6,969,121 B2 * | 11/2005 | Drajan | 297/440.2 |
| 7,004,544 B2 * | 2/2006 | Mitjans | 297/391 |
| 7,216,936 B2 * | 5/2007 | Peterson | 297/440.2 |
| 7,472,959 B1 * | 1/2009 | Ratza et al. | 297/378.1 |
| 7,604,298 B2 * | 10/2009 | Peterson et al. | 297/440.2 |
| 7,625,046 B2 * | 12/2009 | Sanchez | 297/353 |
| 7,677,668 B2 * | 3/2010 | Olsen et al. | 297/378.14 |
| 7,775,591 B2 * | 8/2010 | Hahn et al. | 297/378.1 X |
| 7,857,388 B2 * | 12/2010 | Bedford et al. | 297/284.7 |
| 2004/0189076 A1 * | 9/2004 | Hanson et al. | 297/440.15 |
| 2004/0195897 A1 * | 10/2004 | Mitjans | 297/440.2 |
| 2005/0023879 A1 * | 2/2005 | Drajan | 297/440.2 |
| 2005/0029855 A1 * | 2/2005 | Hanson et al. | 297/440.15 |
| 2005/0151409 A1 * | 7/2005 | Infanti et al. | 297/440.2 |
| 2010/0007190 A1 * | 1/2010 | Johnson et al. | 297/440.15 |

* cited by examiner

CHAIR DEVICE FOR PERSON CARRIER

BACKGROUND OF THE INVENTION

1. Field of the Invention

This invention relates to a chair device for person carrier, particularly to a chair device for person carrier having position limit function in collapsing and unfolding, in which the position limit function is achieved by mutual engagement between a projecting member and a recess such that the chair has appropriate position limit effect in unfolding and collapsing.

2. Brief description of Prior Art

Person having paralysis in lower half body caused by car accident or serious sick such as stroke, or person incapable of walking freely due to muscular dystrophy on his legs caused by chronically lying on bed without taking exercise, or aged person having slow action or incapable of walking freely caused by degenerated physiological function, are often seen everywhere in the world. When those handicapped person want to take long distance travel, they have to walk by the assistance of stick or armchair. However, as these equipments are operated manually so as to displace, handicapped pivot-joint not only consume much physical strength but also fail to move faster. Therefore, much besetting and inconvenience are happened.

In view of the above fact, person carriers transforming electric power into moving power such as electrical scooter or electrical armchair have been developed by the industries to facilitate the handicapped person to move. Although various person carriers sold on the market can achieve the expected effectiveness of assisting handicapped person to move by transforming the electrical power into moving power, most of the chair for person carrier are integral design which is unable to be collapsed, and unfolding of the chair is limited on certain angle. Some manufacturers design the person carrier in detachable manner so as to reduce storage space for carrier, but it takes a lot of time in assembling and disassembling of the carrier and both the implementation and operation are also very inconvenient. Therefore, improvement on the assembling and disassembling of the carrier is expected.

In view of the above problems, the inventor of the present invention provides a novel chair device for person carrier according to the improvement conducted on defects of the existing structure based on his abundant experience of R&D and manufacturing in relevant field so as to attain better performance in practical application.

SUMMARY OF THE INVENTION

In order to achieve the above object, this invention provides a chair device for person carrier having position limit function in collapsing and unfolding, in which the position limit function is achieved by mutual engagement between projecting members and recesses such that the chair has appropriate position limit effect in unfolding and collapsing.

The object and effect of the chair device for person carrier is achieved by the following skill.

The chair is formed by a backrest unit, including a front backrest and a rear backrest, pivotally jointed with respect to a seat unit in which fan-shaped limit projecting members are provided at each pivot-joint end of the seat unit, and the fan-shaped limit projecting members can be angularly displaced to a position so as to be engaged with fan-shaped recesses provided in each pivot-joint end of the rear backrest. In this way, the fan-shaped limit projecting members have a limited space for angular displacement within the fan-shaped recesses so that the backrest unit of the chair can move in the range between a collapsing state and an unfolding state.

Further, the chair device for person carrier of the present invention has reinforcing edge ribs for strength reinforcement purpose provided at both sides where the front backrest is assembled to the rear backrest so as to reinforce the strength of the backrest unit. Thereby, support effect for user's lean-on can be further enhanced such that better performance can be achieved in practical implementation.

The chair device for person carrier of the present invention has a through hole, for the insertion of armrests, integrally formed at the bottom of the seat unit. In this manner, the armrest can be conveniently assembled.

DETAILED DESCRIPTION OF THE PREFERRED EMBODIMENTS

The objects, the technical contents and the expected effectiveness of the present invention will become more apparent from the detailed description of the preferred embodiment in conjunction with the accompanying drawings.

Figure 1:
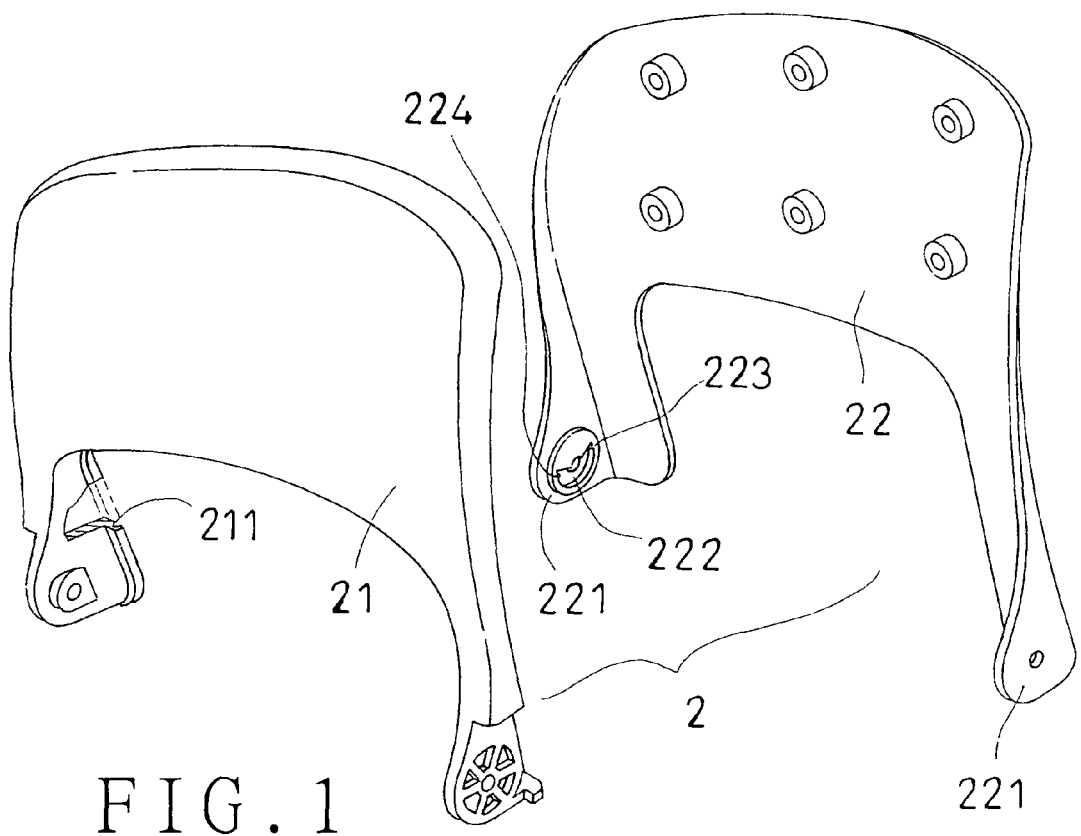
FIG. 1 is a perspective exploded schematic view showing the chair device for person carrier of the present invention.
Figure 1:
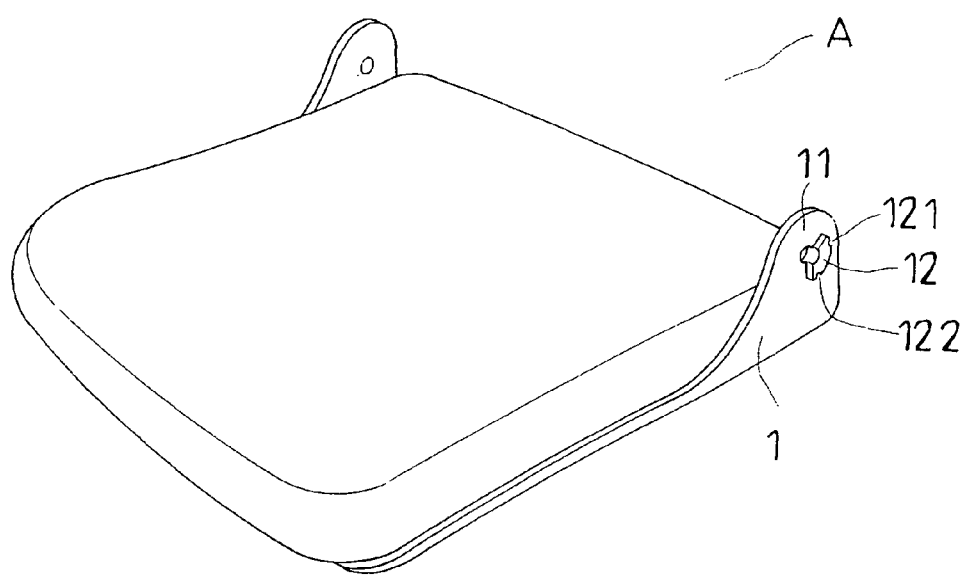
Figure 2:
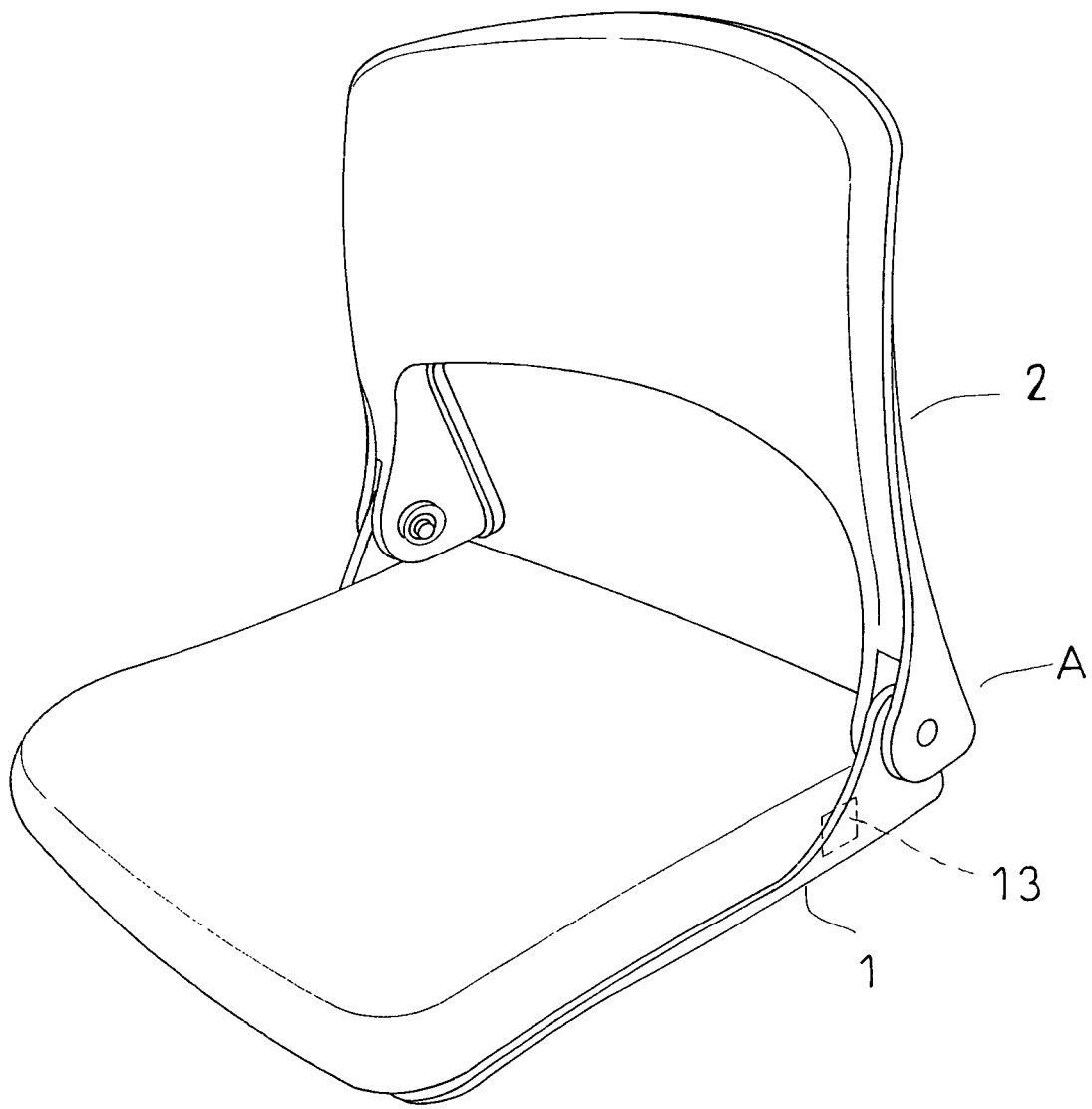
FIG. 2 is a schematic assembled view showing the chair device for person carrier of the present invention.

In FIGS. 1 and 2, perspective schematic exploded and assembled views of the chair device for person carrier of the present invention are shown respectively. The chair (A) is mainly formed by a backrest unit (2), composed of a front backrest (21) and a rear backrest (22), pivotally jointed with respect to a seat unit (1).

The seat unit (1) has two opposite pivot-joint ends (11) at both sides, on which fan-shaped limit projecting members (12) are provided respectively. Two opposite ends of each fan-shaped limit projecting member (12) have a first notch (121) and a second notch (122) respectively.

The rear backrest (22) of the backrest unit (2) has two opposite pivot-joint ends (221) which are pivotally jointed with the pivot-joint ends (11) of the seat unit (1), and the pivot-joint ends (221) of the rear backrest (22) are provided with fan-shaped recesses (222) respectively which can allow the fan-shaped limit projecting members (12) to conduct angular displacement therein. The inner surface of each fan-shaped recess (222) is provided with a first bump (223) and a second bump (224) for respectively engaging with the first notch (121) and the second notch (122) of the corresponding fan-shaped limit projecting member (12).

Referring to FIGS. 1 to 6, the action and the enlarged sectional schematic views of the chair device for person carrier of the present invention are shown respectively. In assembling process (in unfolding state), the front backrest and the rear backrest (21), (22) of the backrest unit (2) are mutually assembled first. Reinforcing edge ribs (211) for strength reinforcement purpose are provided at both sides where the front backrest (21) is assembled to the rear backrest (22), so as to reinforce the strength of the backrest unit (2). Thereby, support effect for user's lean-on can be further enhanced such that better performance can be achieved in practical implementation. Then, the pivot-joint ends (221) extending on both sides of the rear backrest (22) are combined with the pivot-joint ends (11) of the seat unit (1), and the fan-shaped limit projecting members (12) of the seat unit (1) are engaged into the fan-shaped recesses (222) in such manner that the first bump (223) of each fan-shaped recess (222) is engaged with the first notch (121) of each fan-shaped limit projecting member (12). In this way, the assembly of the chair device in unfolding state is completed.

When the backrest unit (2) is to be collapsed, the backrest unit (2) is pushed to displace angularly with the pivot-joint ends (11), (221) as the center such that the fan-shaped recesses (222) of the rear backrest (22) are angularly displaced with respect to the fan-shaped limit projecting members (12). At this moment, the first bump (223) of each fan-shaped recess (222) is separated from the first notch (121) of each fan-shaped limit projecting member (12) and is engaged with the second notch (122) of the same such that the backrest unit (2) is collapsed to lie on the seat unit (1) and is fixed in position.

Figure 3:
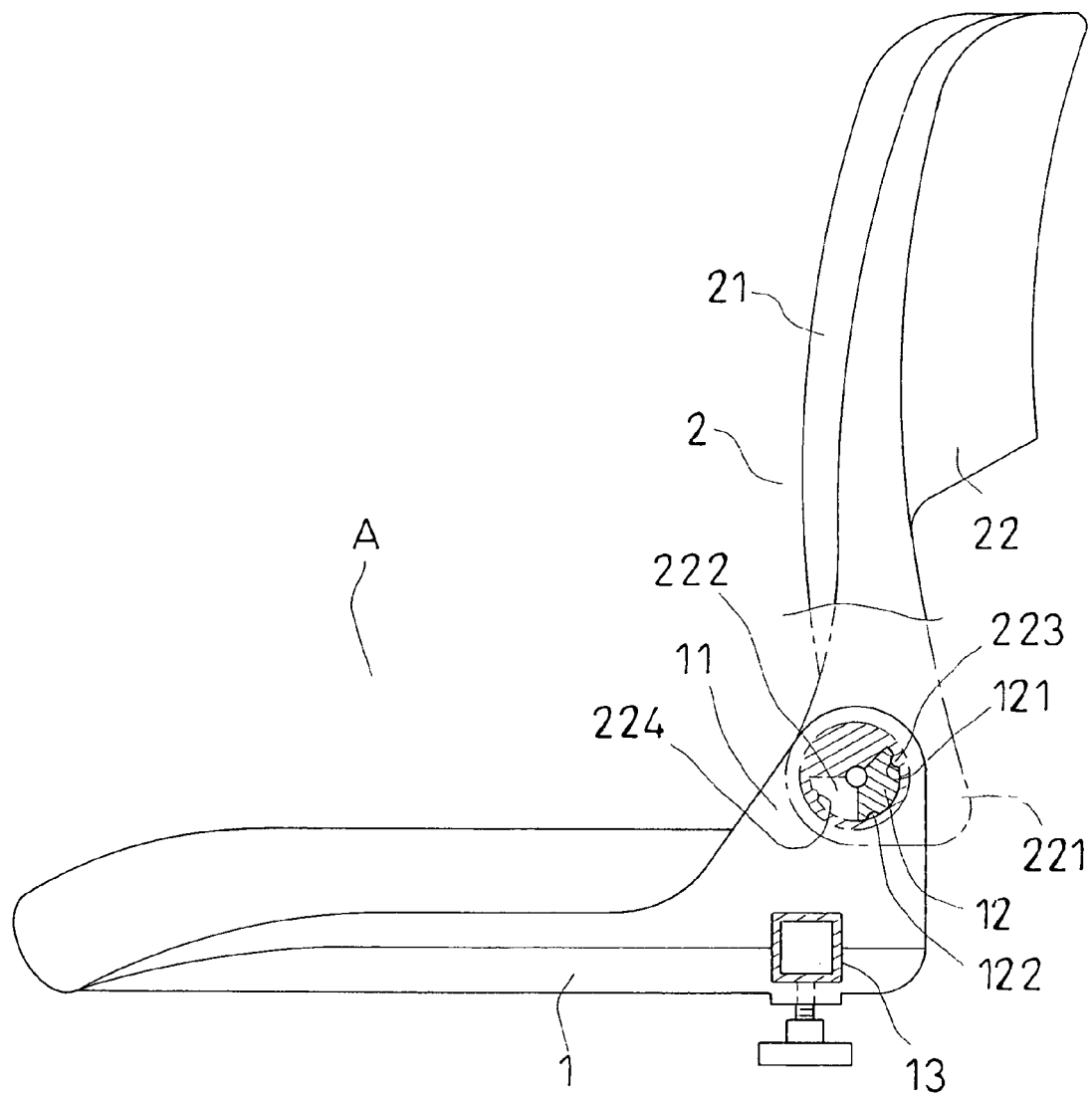
FIG. 3 is a schematic view showing the unfolding action of the chair device for person carrier of the present invention.
Figure 4:
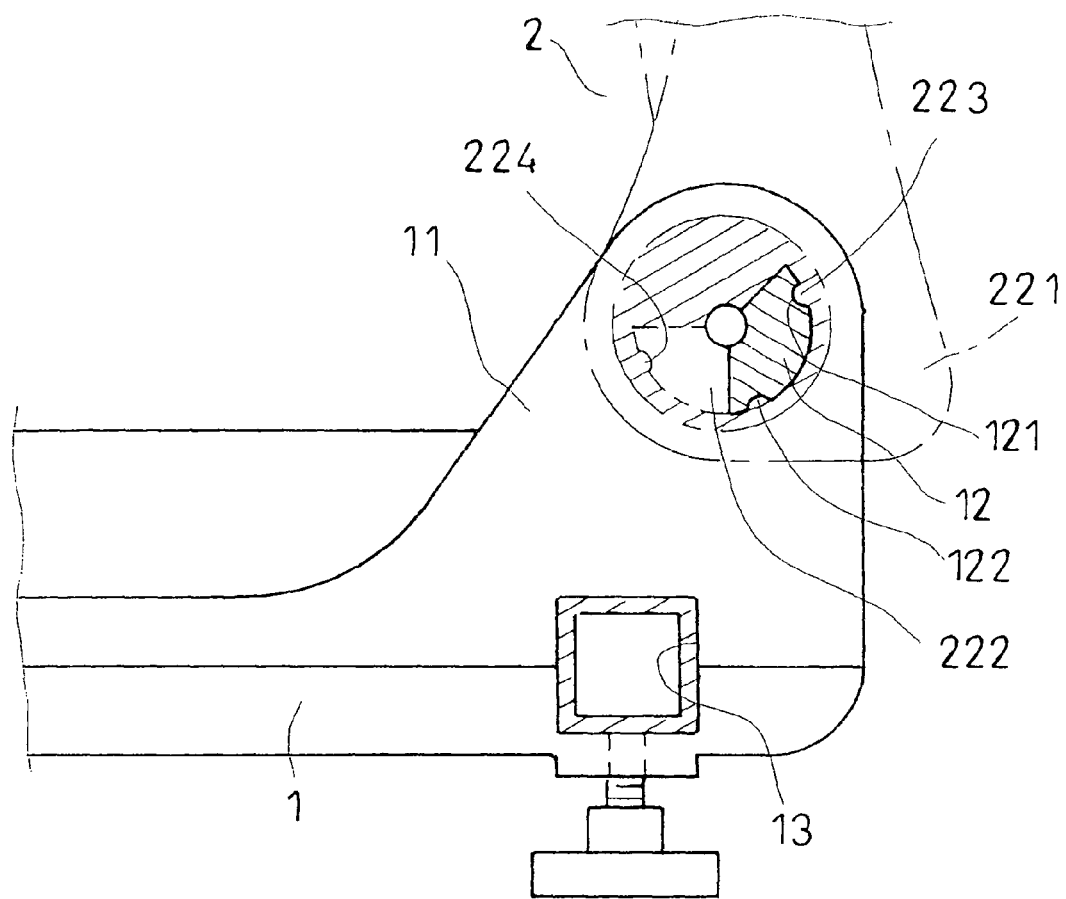
FIG. 4 is an enlarged sectional schematic view showing the unfolding of the chair device for person carrier of the present invention.
Figure 5:
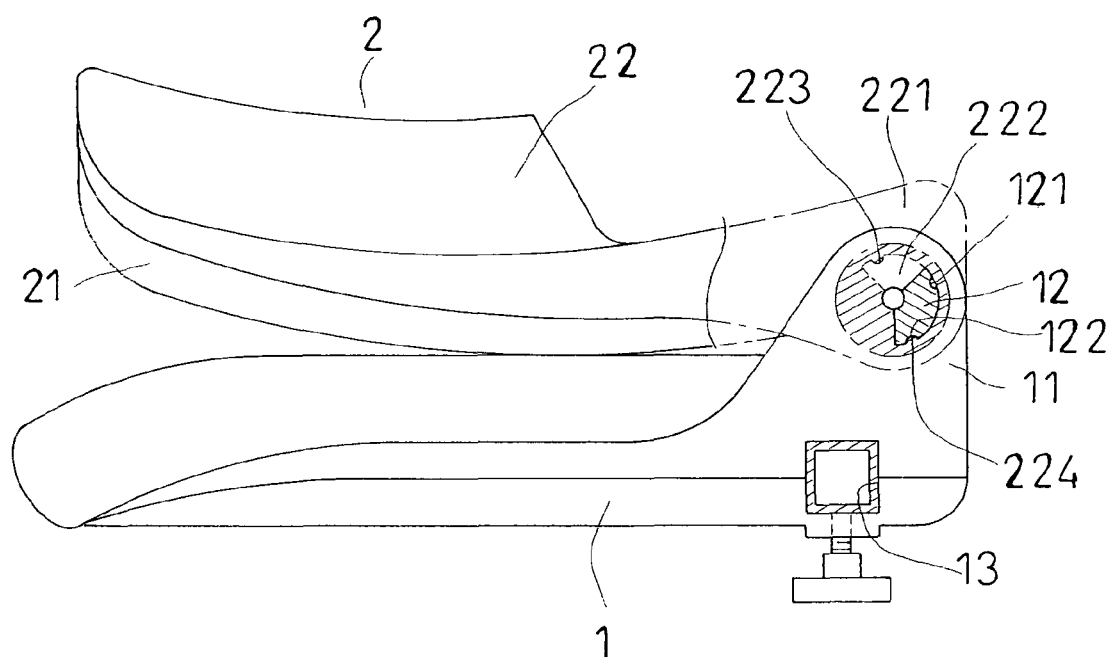
FIG. 5 is a schematic view showing the collapsing of the chair device for person carrier of the present invention.
Figure 6:
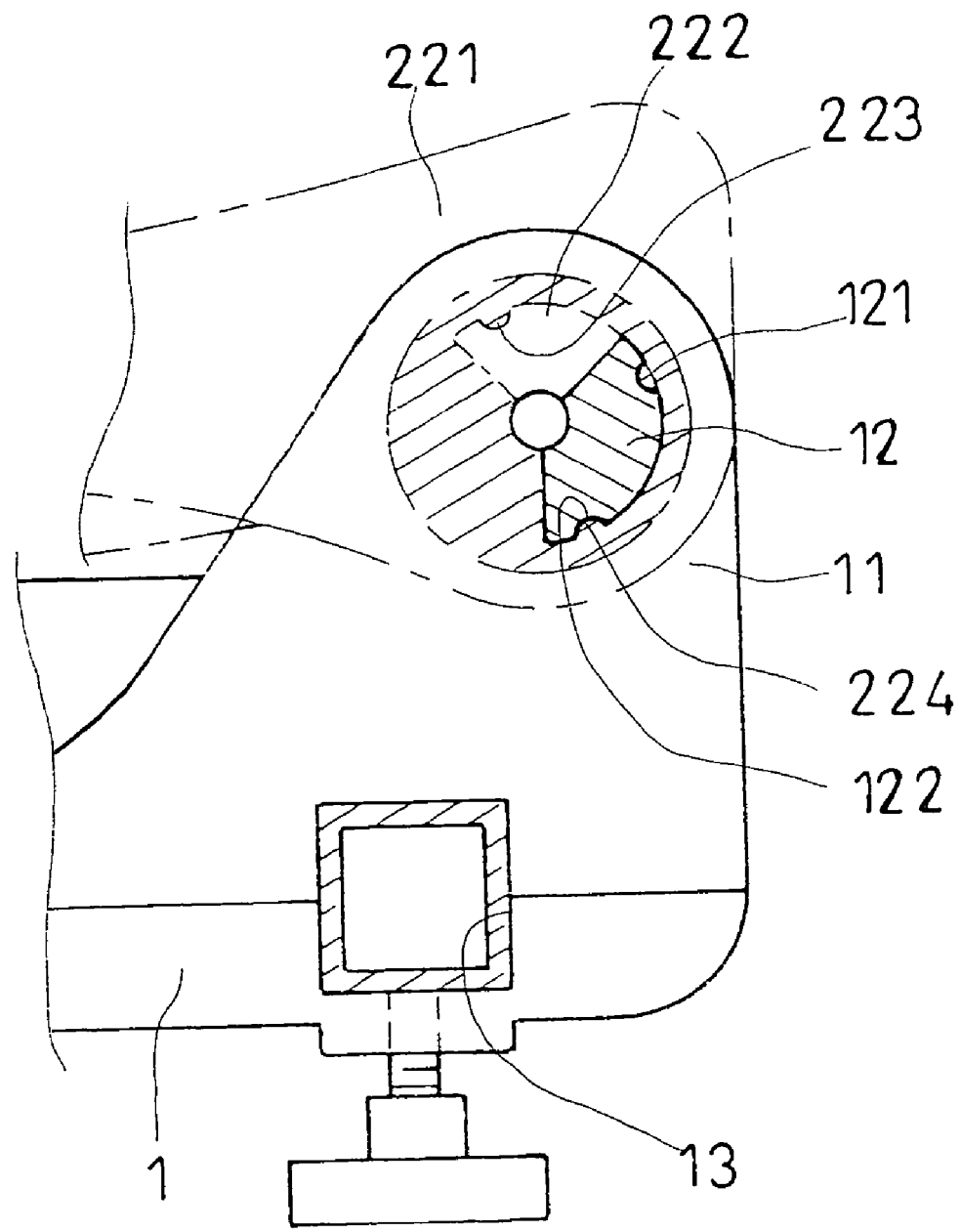
FIG. 6 is an enlarged sectional schematic view showing the collapsing of the chair device for person carrier of the present invention.
Figure 7:
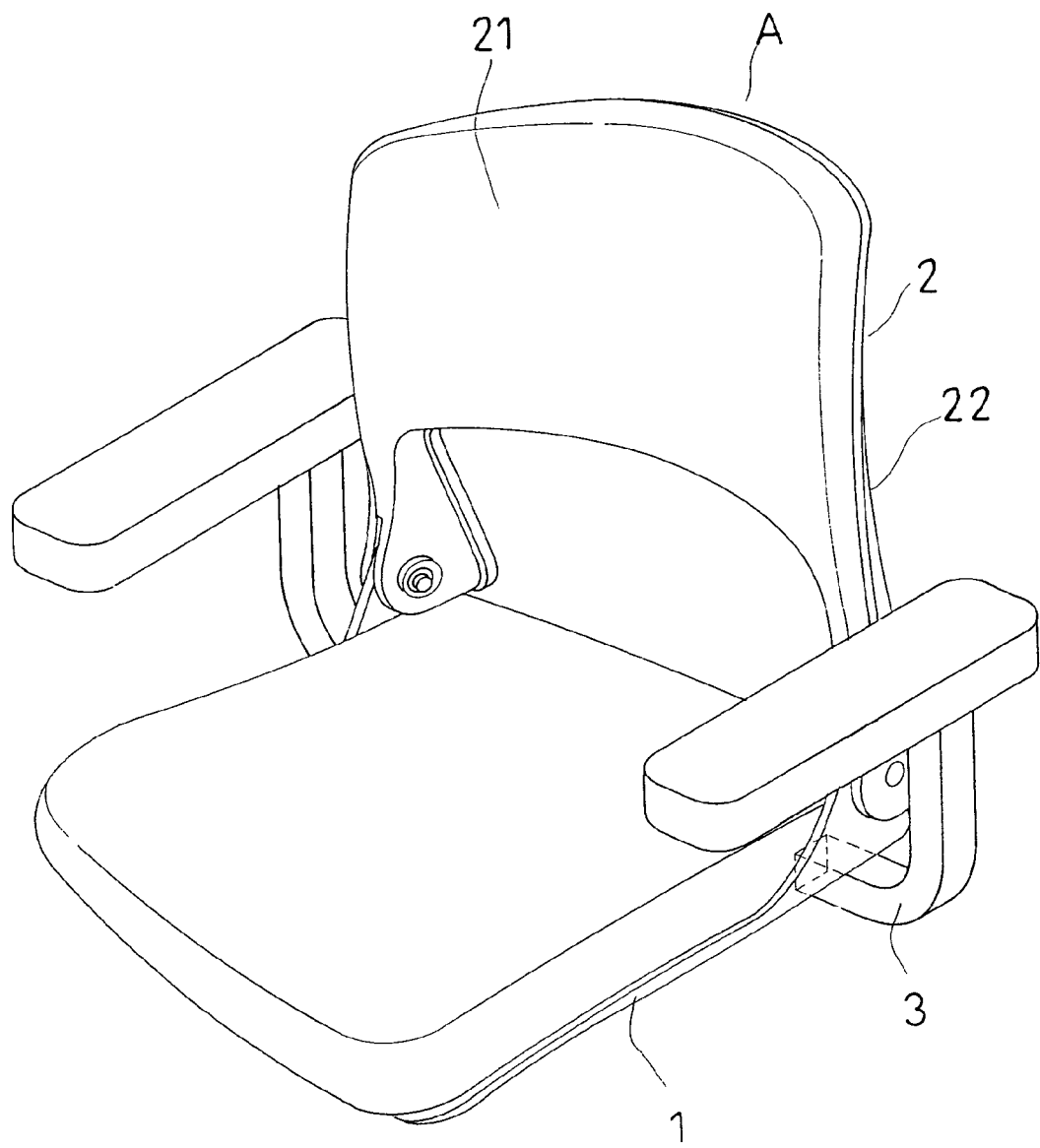
FIG. 7 is a schematic view showing another application state of the chair device for person carrier of the present invention.

In FIGS. 3 and 7, a schematic view of using state of the chair device for person carrier of the present invention is shown. A through hole (13), for the insertion of armrests (3), is integrally formed at the bottom of the seat unit (1). In this manner, the armrest (3) can be conveniently assembled directly in the through hole (13).

The abovementioned are merely preferred embodiments of the present invention, and should not be considered as a limitation on the structural aspect and dimension of the present invention. Equivalent variations and modifications made by the pivot-joint skilled in the art without departing from the spirit and scope of the present invention are still considered to be within the scope of claim of the present invention.

Based on the foregoing, the chair device for person carrier of the present invention has the following advantages when compared with the prior art.

1. The chair device for person carrier of the present invention has appropriate position limit effect in unfolding and collapsing which is achieved by mutual engagement between fan-shaped limit projecting members and fan-shaped recesses provided respectively at the pivot-joint ends of the seat unit and the back backrest, and by the position limiting the engagement between the notches and the bumps.

2. The chair device for person carrier of the present invention has reinforcing edge ribs for strength reinforcement purpose provided at both sides where the front backrest is assembled to the rear backrest so as to reinforce the strength of the backrest unit. Thereby, support effect for user's lean-on can be further enhanced.

3. The chair device for person carrier of the present invention has a through hole, for the insertion of armrests, integrally formed at the bottom of the seat unit. In this manner, the armrest can be conveniently assembled.

Summing up above, the embodiment of the chair device for person carrier of this invention can reach expected effectiveness, and the specific configurations disclosed herein have yet not seen in the prior art of the same category of product, even has not been opened to the public before application.

What is claimed is:

1. A chair device for person carrier, comprising:
a backrest unit pivotally joined to a seat unit, the backrest unit including a front backrest and a rear backrest coupled together and reinforcing edge ribs provided at both sides where the front backrest is assembled to the rear backrest for providing strength reinforcement thereof;
the seat unit having two opposite pivot-joint ends on which fan-shaped limit projecting members are provided; and
the rear backrest of said backrest unit having integrally formed pivot-joint ends provided at corresponding engagement locations where said rear backrest engages with the seat unit, and the pivot-joint ends of the rear backrest are provided with fan-shaped recesses within which the fan-shaped limit projecting members are angularly displaceable.

2. A chair device for person carrier as claimed in claim 1, wherein two opposite ends of each fan-shaped limit projecting member have a first notch and a second notch respectively, and each fan-shaped recess of the rear backrest has a first bump and a second bump respectively engaged with said first notch and said second notch of each fan-shaped limit projecting member.

3. A chair device for person carrier as claimed in claim 1, further comprising a pair of armrests coupled to the seat unit, the seat unit having a through hole for insertion of the armrests therein.

* * * * *